United States Patent
Yu et al.

(10) Patent No.: US 12,009,492 B2
(45) Date of Patent: Jun. 11, 2024

(54) METHOD FOR RECYCLING AND PREPARING POSITIVE ELECTRODE MATERIAL FROM WASTE LITHIUM IRON PHOSPHATE BATTERIES

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); YICHANG BRUNP CONTEMPORARY AMPEREX CO., LTD., Yichang (CN)

(72) Inventors: Haijun Yu, Foshan (CN); Aixia Li, Foshan (CN); Yinghao Xie, Foshan (CN); Changdong Li, Foshan (CN); Xuemei Zhang, Foshan (CN); Yingsheng Zhong, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD, Changsha (CN); YICHANG BRUNP CONTEMPORARY AMPEREX CO., LTD., Yichang (CN)

( * ) Notice: Subject to any disclaimer, the term of this patent is extended or adjusted under 35 U.S.C. 154(b) by 0 days.

(21) Appl. No.: 18/260,005

(22) PCT Filed: Aug. 11, 2022

(86) PCT No.: PCT/CN2022/111816
§ 371 (c)(1),
(2) Date: Jun. 29, 2023

(87) PCT Pub. No.: WO2023/087800
PCT Pub. Date: May 25, 2023

(65) Prior Publication Data
US 2024/0063451 A1    Feb. 22, 2024

(30) Foreign Application Priority Data

Nov. 18, 2021   (CN) .......................... 202111367677.5

(51) Int. Cl.
*H01M 10/54* (2006.01)
*C01B 25/45* (2006.01)
(Continued)

(52) U.S. Cl.
CPC ............ *H01M 10/54* (2013.01); *C01B 25/45* (2013.01); *H01M 2004/028* (2013.01);
(Continued)

(58) Field of Classification Search
None
See application file for complete search history.

(56) References Cited

U.S. PATENT DOCUMENTS

2010/0012149 A1*   1/2010   Arimura .............. H01M 10/54
                                                                        134/184

FOREIGN PATENT DOCUMENTS

| CN | 102208706 A | 10/2011 |
|---|---|---|
| CN | 102709620 A | 10/2012 |

(Continued)

OTHER PUBLICATIONS

Yadav, Prasad, et al. "Recycling of cathode from spent lithium iron phosphate batteries." Journal of Hazardous Materials, vol. 399, May 30, 2020, p. 123068, https://doi.org/10.1016/j.jhazmat.2020. 123068. (Year: 2020).*

(Continued)

*Primary Examiner* — Robert S Carrico
(74) *Attorney, Agent, or Firm* — Buchalter; Jason W. Croft

(57) ABSTRACT

A method for recycling and preparing a positive electrode material from waste lithium iron phosphate batteries. The (Continued)

method comprises the following steps: discharging, crushing, and stripping waste lithium iron phosphate batteries to obtain black powder; then mixing the black powder with benzenesulfonate, and reacting in a fluidized bed; and then adding an acid and an alkali to remove impurities, finally adding a lithium supplement, an iron supplement, or a phosphate, and a reducing agent, and sintering. According to the method, by controlling and optimizing the crushing, stripping, carbon and fluorine removal, and impurity removal processes, a positive electrode material with high purity can be recycled while controlling the recycling cost, and batteries prepared by means of the recycled positive electrode material have good performance.

11 Claims, 2 Drawing Sheets

(51) Int. Cl.
  *H01M 4/02* (2006.01)
  *H01M 4/58* (2010.01)
  *H01M 10/0525* (2010.01)
(52) U.S. Cl.
  CPC ...... *H01M 4/5825* (2013.01); *H01M 10/0525* (2013.01); *Y02W 30/84* (2015.05)

(56) References Cited

FOREIGN PATENT DOCUMENTS

| | | | |
|---|---|---|---|
| CN | 102709620 A | | 10/2012 |
| CN | 111924819 A | | 11/2020 |
| CN | 111924819 A | | 11/2020 |
| CN | 111945016 A | | 11/2020 |
| CN | 112811404 A | * 5/2021 | ........... C01B 25/375 |
| CN | 113151682 A | | 7/2021 |
| CN | 114229816 A | | 3/2022 |
| CN | 114229816 B | | 4/2023 |
| JP | 2000348782 A | | 12/2000 |
| KR | 20210085420 A | | 7/2021 |
| WO | 2017215283 A1 | | 12/2017 |

OTHER PUBLICATIONS

Notification to Grant Patent Right for Invention in Chinese patent application No. 202111367677.5 mailed Jan. 11, 2023.
International Search Report for PCT/CN2022/111816 mailed Oct. 26, 2022.
Written Opinion for PCT/CN2022/111816 mailed Oct. 26, 2022.
First Search in Chinese Patent Application 2021113676775 mailed Nov. 25, 2022.

* cited by examiner

METHOD FOR RECYCLING AND PREPARING POSITIVE ELECTRODE MATERIAL FROM WASTE LITHIUM IRON PHOSPHATE BATTERIES

CROSS-REFERENCE TO RELATED APPLICATION

This application is a national stage filing under 35 U.S.C. § 371 of international application number PCT/CN2022/111816, filed Aug. 11, 2022, which claims priority to Chinese patent application No. 202111367677.5, filed Nov. 18, 2021. The contents of these applications are incorporated herein by reference in their entirety.

TECHNICAL FIELD

The present disclosure relates to the technical field of recycling battery materials, and particularly, to a method for recycling and preparing a cathode material from a waste lithium iron phosphate battery.

BACKGROUND

Although lithium iron phosphate batteries are inferior to those of the same type of transition metal oxide batteries, such as lithium nickel cobalt manganese and lithium manganese, in working voltage platform and capacity density, the lithium iron phosphate batteries are superior to the transition metal oxide batteries in charge and discharge cycle life, safety, thermal stability and manufacturing cost. Therefore, under the demands for long life, low cost and easy use of batteries, the lithium iron phosphate batteries have become a preferred choice for electric energy storage and power batteries. With the development of the lithium iron phosphate battery industry, it can be expected that a large number of waste lithium iron phosphate batteries will be replaced in the future. Therefore, how to deal with and recycle the waste lithium iron phosphate batteries will also become a big problem.

Currently, recycling the waste lithium iron phosphate batteries generally includes the following steps of: classifying the waste lithium iron phosphate battery according to chemical compositions of the battery, then physically dismounting the waste lithium iron phosphate battery, then performing high-temperature calcination and crushing for separation, and extracting the electrolyte. There are still some problems in this recycling method, for example, during mechanical crushing, waste polyanion batteries may be affected by crushed shells and crushed current collectors and diaphragms, so as to change physical and chemical components of a cathode material to be recycled. On one hand, the crushing process destroys an internal crystal arrangement of the cathode material. On the other hand, the crushing process mixes copper-aluminum and phosphate radical with the electrolyte and the binder together, which increases the difficulty of subsequent purification. Especially, the crushing of aluminum and copper foils makes the aluminum and copper foils be mixed with each other, and the mixture cannot be separated accurately by mechanical separation. Therefore, the recycling cost is high, and the purity of the recycled cathode material is low, and the batteries prepared again cannot meet performance requirements, which also limit the industrial application and popularization of the lithium iron phosphate battery to a certain extent.

Therefore, it is urgent to provide a method for recycling and preparing a cathode material from a waste lithium iron phosphate battery, which can recycle and obtain a cathode material with high purity while controlling the recycling cost, and batteries prepared again by using the recycled cathode material have good performances.

SUMMARY

The present disclosure aims at solving at least one of the above-mentioned technical problems in the prior art. Therefore, the present disclosure proposes a method for recycling and preparing a cathode material from a waste lithium iron phosphate battery, which can recycle and obtain a cathode material with high purity while controlling the recycling cost, and batteries prepared again by using the recycled cathode material have good performances.

The present disclosure provides a method for recycling and preparing a cathode material from a waste lithium iron phosphate battery.

Specifically, the method for recycling and preparing the cathode material from the waste lithium iron phosphate battery includes the following steps of:
(1) discharging a waste lithium iron phosphate battery, drying an electrolyte inside the waste lithium iron phosphate battery, then crushing to obtain crushed pieces, and stripping the crushed pieces to obtain a black powder;
(2) mixing the black powder obtained in step (1) with benzene sulfonate, and then reacting in a fluidized bed to obtain a black powder without carbon and fluorine removed;
(3) adding acid into the black powder without carbon and fluorine removed in step (2) for solid-liquid separation to obtain a solution A and a solid A; and then, adding alkali into the solution A until no precipitation is generated, and performing solid-liquid separation to obtain a solution B and a solid B; and
(4) mixing the solid A and the solution B obtained in step (3), adding at least one of a lithium supplement agent, an iron supplement agent or phosphate to obtain a mixture, then adding a reducing agent into the mixture, and sintering to obtain a cathode material.

Preferably, in step (1), the discharging process is that the waste lithium iron phosphate battery is placed in a solution of metal salt and discharged for 0.1 day to 10 days.

Preferably, the metal salt is selected from one or more of sodium chloride, sodium sulfate, sodium phosphate, magnesium chloride, magnesium sulfate, lithium sulfate or lithium chloride.

Preferably, in the solution of the metal salt, a mass concentration of the metal salt respectively ranges from 0.1 w % to 20 w %.

Preferably, in step (1), the drying process is that the waste lithium iron phosphate battery is placed in a sintering furnace, a kiln, a muffle furnace, an electric furnace or an oven and dried at 15° C. to 150° C. for 1 hour to 120 hours. Alternatively, the waste lithium iron phosphate battery may be placed under solar radiation.

Preferably, in step (1), the crushing process is that the waste lithium iron phosphate battery is sheared for 1 times to 10 times to obtain the crushed pieces.

Preferably, an area ratio of the crushed pieces to the waste lithium iron phosphate battery is greater than 5%; and further preferably, the area ratio of the crushed pieces to the waste lithium iron phosphate battery is greater than 10%.

Preferably, in step (1), the stripping process is that the crushed pieces are placed in a stripping liquid, subjected to primary heating, and separated into a solid and a separated liquid; and then, the separated liquid is subjected to secondary heating, and the stripping liquid is removed to obtain the black powder. The solid refers to aluminum and copper foils which are recycled after separation.

Preferably, the stripping liquid includes polyol and phosphoester.

In the process of crushing the waste lithium iron phosphate battery, with the increasing shearing times, waste and used lithium iron phosphate electrode plates are smaller, and aluminum-copper scraps or aluminum-copper powders in the corresponding electrode material are more, which is not conducive to later removal, resulting in that an aluminum-copper content in the final prepared cathode material is high, which affects the performances of the cathode material. The inventor(s) find(s) that by controlling the sizes of the crushed pieces after shearing and using a stripping liquid containing polyol and phosphoester for stripping treatment, the stripping liquid hardly produced aluminum-copper scraps, which can reduce the aluminum-copper content in the final prepared cathode material and the stripping liquid can be recycled.

Preferably, the polyol is selected from at least one of ethylene glycol, propylene glycol, propanetriol, isopropanol, butanol, 1,2-butanediol or 1,3-butanediol.

Preferably, the phosphoester is selected from at least one of phosphomonoester, phosphodiester, phosphotriester, triethyl phosphate or trimethyl phosphate.

Preferably, a volume ratio of the polyol to the phosphoester is 1:(0.1 to 1); and further preferably, the volume ratio of the polyol to the phosphoester is 1:(0.3 to 0.8).

Preferably, the primary heating is performed at a temperature of 130° C. to 210° C., and the primary heating lasts for 0.5 hour to 10 hours; and further preferably, the primary heating is performed at a temperature of 160° C. to 210° C., and the primary heating lasts for 1 hour to 8 hours.

Preferably, the secondary heating is performed at a temperature of 210° C. to 300° C., and the secondary heating lasts for 2 hours to 12 hours.

Preferably, in step (2), the benzene sulfonate is selected from at least one of sodium p-toluenesulfonate, sodium 4-methylbenzenesulfonate, sodium benzenesulfonate or zinc benzenesulfonate. Benzene sulfonate decomposes at high temperature to produce sulfur dioxide and water, which can promote the pyrolysis of a membrane (polyethylene, polypropylene), an electrolyte ($LiClO_4$, $LiPF_6$, carbonate) and a binder (polyvinylidene fluoride) in the black powder, and is beneficial to remove fluorine and carbon.

Preferably, in step (2), an addition amount of the benzene sulfonate is 0.1 w % to 5 w % of the black powder; and further preferably, the addition amount of the benzene sulfonate is 0.1 w % to 3 w % of the black powder.

Preferably, in step (2), the reaction is performed at a temperature of 300° C. to 850° C., and lasts for 1 minute to 360 minutes; and further preferably, in step (2), the reaction is performed at a temperature of 400° C. to 750° C., and lasts for 30 minutes to 240 minutes.

Preferably, gas in the fluidized bed includes at least one of oxygen, carbon dioxide or nitrogen.

Preferably, in step (2), a mass percentage of the carbon in the black powder without carbon and fluorine removed is less than 2%.

In a traditional method, a heating furnace is used to pyrolyze the black powder, and heat released by the heating furnace is transferred from a surface of the black powder to the inside. A part of the heat cannot be transferred into the black powder, which is highly susceptible to cause heat loss, and the inside needs a long heating time, so that the heating furnace cannot fully pyrolyze a diaphragm (polyethylene, polypropylene), an electrolyte ($LiClO_4$, $LiPF_6$, carbonate), a binder (polyvinylidene fluoride) and other substances in the black powder. According to the present disclosure, the fluidized bed pyrolysis method is adopted, and with the use of benzene sulfonate, the black powder layer is heated at a uniform temperature, so that local overheating can be avoided, and the black powder is easy to flow between devices, which has a high conveying capacity, and is suitable for large-scale pyrolysis. The sulfur dioxide and water produced by the benzene sulfonate decomposed at high temperature promotes the pyrolysis of the membrane (polyethylene, polypropylene), the electrolyte ($LiClO_4$, $LiPF_6$, carbonate) and the binder (polyvinylidene fluoride) in the black powder. The combination of the two can make the pyrolysis of fluorine-containing and carbon-containing substances in the black powder more thorough, which is beneficial to the removal of the carbon and fluorine in the black powder.

Preferably, in step (3), the acid is selected from at least one of phosphoric acid, formic acid, lactic acid, citric acid, oxalic acid or acetic acid.

Preferably, in step (3), the acid has a molar concentration of 0.01 mol/L to 6 mol/L.

Preferably, in step (3), the alkali is selected from calcium hydroxide or/and magnesium hydroxide.

In step (3), the solid A is iron phosphate, the solution A is an impurity-containing lithium hydroxide solution, the solution B is a lithium hydroxide solution, and the solid B is aluminum hydroxide and copper hydroxide.

Preferably, in step (4), the lithium supplement agent is selected from at least one of lithium carbonate, lithium oxalate or lithium phosphate.

Preferably, in step (4), the iron supplement agent is selected from at least one of ferric hydroxide, iron phosphate, ferric oxalate, ferrous oxalate, ferric citrate or ferrous citrate.

Preferably, in step (4), the phosphate is selected from at least one of ammonium phosphate, ammonium hydrogen phosphate, sodium phosphate, ferrous phosphate, iron phosphate or phosphoric acid.

Preferably, in step (4), a molar ratio of lithium to iron to phosphate radical in the mixture is (0.1 to 20):(0.1 to 20):(0.1 to 20).

Preferably, in step (4), the reducing agent is selected from at least one of glucose, fructose or starch.

Preferably, in step (4), an addition amount of the reducing agent accounts for 1 w % to 25 wt % of the mixture.

Compared with the prior art, the present disclosure has the following beneficial effects.

(1) The method for recycling and preparing the cathode material from the waste lithium iron phosphate battery proposed by the present disclosure can control and optimize the processes of crushing, stripping, removing carbon and fluorine, and removing impurities to recycle and obtain the cathode material with high purity while controlling the recycling cost, and the batteries prepared again by using the recycled cathode material have good performances.

(2) The recycling method provided by the present disclosure can not only effectively reduce the contents of aluminum, copper, carbon and fluorine in the black powder, but also only need to supplement iron or lithium for carbothermic reduction when the cathode material is regenerated.

DETAILED DESCRIPTION

In order to make the technical solutions of the present disclosure clearer to those skilled in the art, the following embodiments are listed for explanation. It should be noted that the following embodiments do not limit the scope of protection claimed by the present disclosure.

Unless otherwise specified, the raw materials, reagents or devices used in the following embodiments can be obtained from conventional commercial sources or by existing known methods.

Embodiment 1

Figure 1:
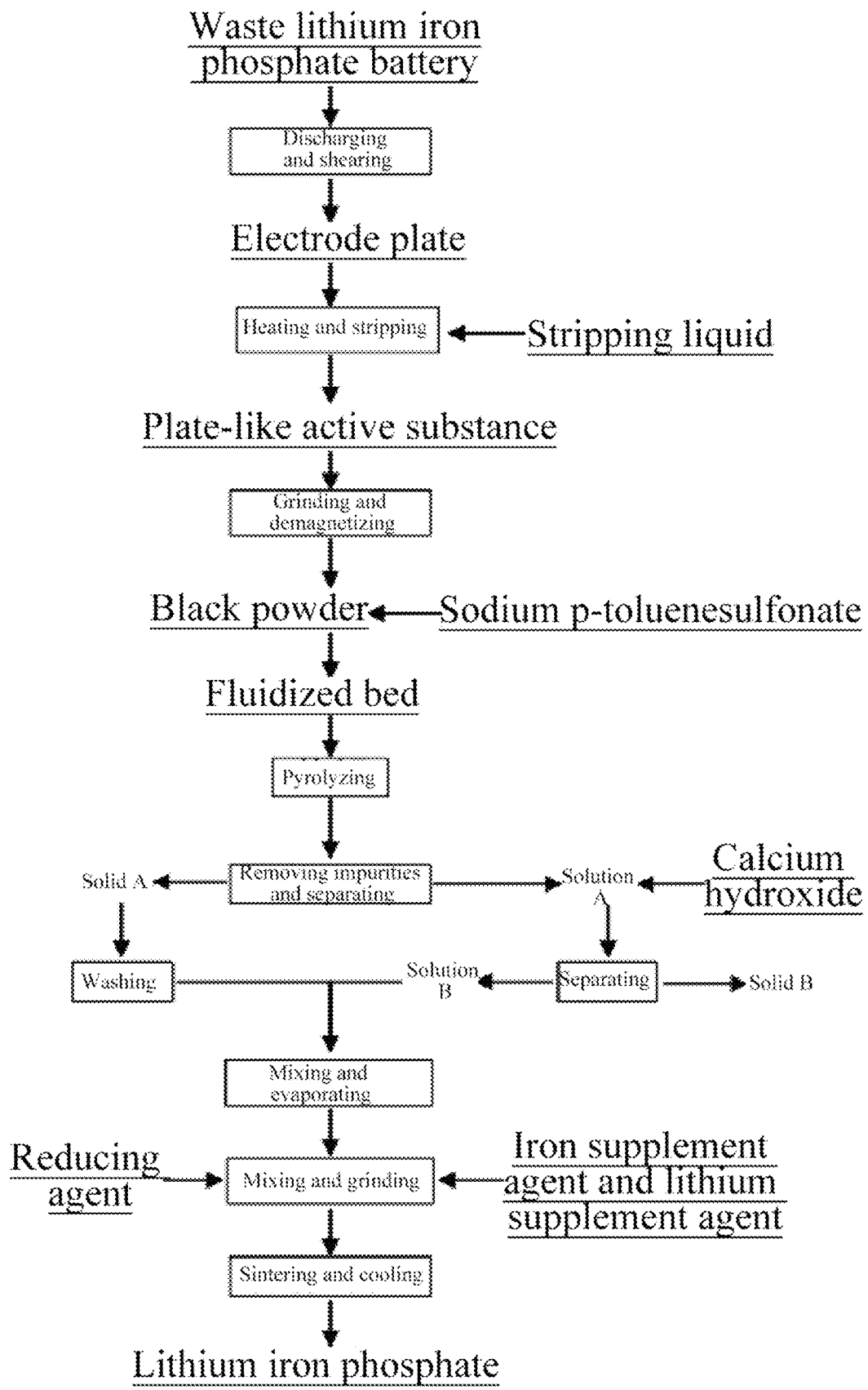
FIG. 1 is a process flowchart of Embodiment 1.

A method for recycling and preparing a cathode material from a waste lithium iron phosphate battery, the process flowchart of which was as shown in FIG. 1, includes the following steps.

(1) Pre-treating battery: 38.3 kg of recycled waste lithium iron phosphate batteries were put into tap water containing 1.7% sodium chloride (mass concentration), discharged for 4 days, and then exposed to solar radiation to dry electrolytes inside the batteries. The batteries were sheared for three times to get crushed pieces, and make an area ratio of the crushed pieces (electrode plates) to the batteries was about 30%. The crushed pieces were placed in a stripping liquid (a volume ratio of propanetriol to triethyl phosphate was 1:0.5), covered by the stripping liquid, heated up to 170° C. by a heating plant, maintained at the temperature for 2 hours and 20 minutes, stirred and sieved to obtain solids and a separation liquid. The solids were aluminum and copper foils and recycled. The separation liquid containing plate-like active substances was heated continuously, kept at 225° C. for 3 hours and 30 minutes, and the stripping liquid was recycled to separate the plate-like active substances. The plate-like active substances were ground and demagnetized to obtain 9.2 kg of black powder.

(2) Removing carbon and fluorine: 25.0 g of sodium p-toluenesulfonate were added into the black powder obtained in step (1) and mixed. A heater and a pump of a fluidized bed were enabled to heat and pump air, and pump the black powder to a combustion chamber for reaction. A heating temperature of the combustion was controlled to be about 560° C. Then the black powder was burnt and cooled to recycle 9.17 kg of black powder with carbon and fluorine removed.

(3) Removing impurities: 1.0 kg of black powder with carbon and fluorine removed were taken and pickled with 1 mol/L phosphoric acid for solid-liquid separation to obtain a solid A and a solution A. The solid A was washed with water for later use. 2.6 g of calcium hydroxide were added to the solution A and stirred to adjust a pH until the precipitation did not increase, and then solid-liquid separation was performed to obtain a solid B and a solution B. The solution B was a solution containing lithium hydroxide.

Figure 2:
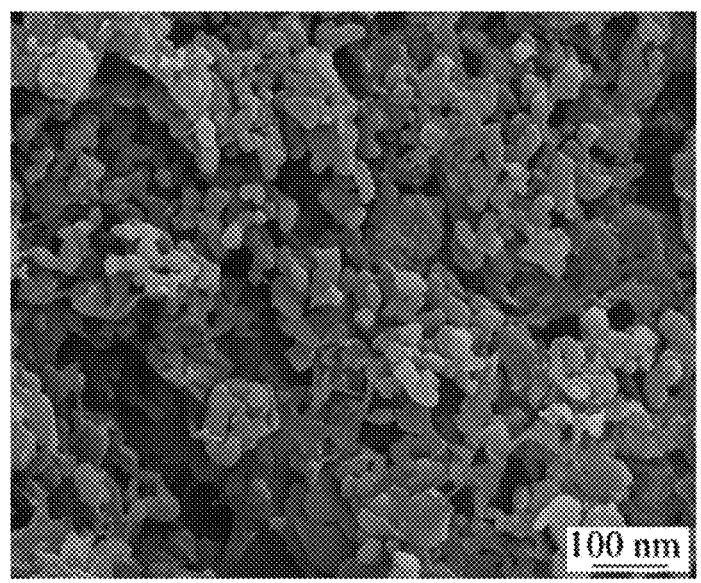
FIG. 2 is an SEM graph of a lithium iron phosphate cathode material prepared in Embodiment 1.

(4) Regenerating cathode material: The solid A and the solution B were mixed and evaporated to remove water. A molar ratio of iron to lithium and phosphate in the evaporated solid (mol=6.134:6.063:6.181) was measured, and 0.048 mol of ferrous oxalate and 0.060 mol of lithium carbonate (molar ratio of iron to lithium and phosphate radical=6.182:6.181:6.183) were added. Then 90 g of glucose were added for mixing and ball-milling, heated to 570° C. in neon environment, sintered for 8 hours and 35 minutes, and cooled to obtain regenerated lithium iron phosphate cathode material. FIG. 2 was an SEM graph of the lithium iron phosphate cathode material. In FIG. 2, the regenerated lithium iron phosphate cathode material had a particle size of about 50 nm, and only some particle sizes were about 50 nm to 150 nm. The lithium iron phosphate cathode material had uniform particle size and high concentration of particle size.

Embodiment 2

A method for recycling and preparing a cathode material from a waste lithium iron phosphate battery includes the following steps.

(1) Pre-treating battery: 23.4 kg of recycled waste lithium iron phosphate batteries were put into tap water containing 1.7% sodium chloride (mass concentration), discharged for 4 days, and then exposed to solar radiation to dry electrolytes inside the batteries. The batteries were sheared for three times to get crushed pieces, and make an area ratio of the crushed pieces to the batteries was about 30%. The crushed pieces were placed in a stripping liquid (a volume ratio of propanetriol to triethyl phosphate was 1:0.5), covered by the stripping liquid, heated up to 160° C. by a heating plant, maintained at the temperature for 2 hours and 20 minutes, stirred and sieved to obtain solids and a separation liquid. The solids were aluminum and copper foils and recycled. The separation liquid containing plate-like active substances was heated continuously, kept at 215° C. for 4 hours and 25 minutes, and the stripping liquid was recycled to separate the plate-like active substances. The plate-like active substances were ground and demagnetized to obtain 5.8 kg of black powder.

(2) Removing carbon and fluorine: 20.0 g of sodium p-toluenesulfonate were added into the black powder obtained in step (1) and mixed. A heater and a pump of a fluidized bed were enabled to heat and pump air, and pump the black powder to a combustion chamber for reaction. A heating temperature of the combustion was controlled to be about 550° C. Then the black powder was burnt and cooled to recycle 4.6 kg of black powder with carbon and fluorine removed.

(3) Removing impurities: 1.0 kg of black powder with carbon and fluorine removed were taken and pickled with 1 mol/L phosphoric acid for solid-liquid separation to obtain a solid A and a solution A. The solid A was washed with water for later use. 2.6 g of calcium hydroxide were added to the solution A and stirred to adjust a pH until the precipitation did not increase, and then solid-liquid separation was performed to obtain a solid B and a solution B. The solution B was a solution containing lithium hydroxide.

(4) Regenerating cathode material: The solid A and the solution B were mixed and evaporated to remove water. A molar ratio of iron to lithium and phosphate in the evaporated solid (mol=6.110:6.037:6.174) was measured, and 0.064 mol of ferrous oxalate and 0.137 mol of lithium carbonate (molar ratio of iron to lithium and phosphate radical=6.174:6.174:6.174) were added. Then 85 g of glucose were added for mixing and ball-milling, heated to 570°

C. in neon environment, sintered for 8 hours and 35 minutes, and cooled to obtain regenerated lithium iron phosphate cathode material.

Embodiment 3

A method for recycling and preparing a cathode material from a waste lithium iron phosphate battery includes the following steps.

(1) Pre-treating battery: 50.2 kg of recycled waste lithium iron phosphate batteries were put into tap water containing 1.7% sodium chloride (mass concentration), discharged for 4 days, and then exposed to solar radiation to dry electrolytes inside the batteries. The batteries were sheared for three times to get crushed pieces, and make an area ratio of the crushed pieces to the batteries was about 30%. The crushed pieces were placed in a stripping liquid (a volume ratio of propanetriol to triethyl phosphate was 1:0.6), covered by the stripping liquid, heated up to 180° C. by a heating plant, maintained at the temperature for 2 hours and 20 minutes, stirred and sieved to obtain solids and a separation liquid. The solids were aluminum and copper foils and recycled. The separation liquid containing plate-like active substances was heated continuously, kept at 238° C. for 4 hours and 47 minutes, and the stripping liquid was recycled to separate the plate-like active substances. The plate-like active substances were ground and demagnetized to obtain 11.8 kg of black powder.

(2) Removing carbon and fluorine: 32.0 g of sodium p-toluenesulfonate were added into the black powder obtained in step (1) and mixed. A heater and a pump of a fluidized bed were enabled to heat and pump air, and pump the black powder to a combustion chamber for reaction. A heating temperature of the combustion was controlled to be about 570° C. Then the black powder was burnt and cooled to recycle 9.3 kg of black powder with carbon and fluorine removed.

(3) Removing impurities: 1.0 kg of black powder with carbon and fluorine removed were taken and pickled with 1 mol/L phosphoric acid for solid-liquid separation to obtain a solid A and a solution A. The solid A was washed with water for later use. 2.6 g of calcium hydroxide were added to the solution A and stirred to adjust a pH until the precipitation did not increase, and then solid-liquid separation was performed to obtain a solid B and a solution B. The solution B was a solution containing lithium hydroxide.

(4) Regenerating cathode material: The solid A and the solution B were mixed and evaporated to remove water. A molar ratio of iron to lithium and phosphate in the evaporated solid (mol=6.142:6.068:6.217) was measured, and 0.067 mol of ferrous oxalate and 0.143 mol of lithium carbonate (molar ratio of iron to lithium and phosphate radical=6.209:6.211:6.217) were added. Then 90 g of glucose were added for mixing and ball-milling, heated to 570° C. in neon environment, sintered for 8 hours and 35 minutes, and cooled to obtain regenerated lithium iron phosphate cathode material.

Embodiment 4

A method for recycling and preparing a cathode material from a waste lithium iron phosphate battery includes the following steps.

(1) Pre-treating battery: 46.5 kg of recycled waste lithium iron phosphate batteries were put into tap water containing 1.7% sodium chloride (mass concentration), discharged for 4 days, and then exposed to solar radiation to dry electrolytes inside the batteries. The batteries were sheared for three times to get crushed pieces, and make an area ratio of the crushed pieces to the batteries was about 20%. The crushed pieces were placed in a stripping liquid (a volume ratio of propanetriol to triethyl phosphate was 1:0.6), covered by the stripping liquid, heated up to 180° C. by a heating plant, maintained at the temperature for 2 hours and 50 minutes, stirred and sieved to obtain solids and a separation liquid. The solids were aluminum and copper foils and recycled. The separation liquid containing plate-like active substances was heated continuously, kept at 212° C. for 5 hours and 26 minutes, and the stripping liquid was recycled to separate the plate-like active substances. The plate-like active substances were ground and demagnetized to obtain 11.3 kg of black powder.

(2) Removing carbon and fluorine: 32.0 g of sodium p-toluenesulfonate were added into the black powder obtained in step (1) and mixed. A heater and a pump of a fluidized bed were enabled to heat and pump air, and pump the black powder to a combustion chamber for reaction. A heating temperature of the combustion was controlled to be about 560° C. Then the black powder was burnt and cooled to recycle 8.9 kg of black powder with carbon and fluorine removed.

(3) Removing impurities: 1.0 kg of black powder with carbon and fluorine removed were taken and pickled with 1 mol/L phosphoric acid for solid-liquid separation to obtain a solid A and a solution A. The solid A was washed with water for later use. 2.7 g of calcium hydroxide were added to the solution A and stirred to adjust a pH until the precipitation did not increase, and then solid-liquid separation was performed to obtain a solid B and a solution B. The solution B was a solution containing lithium hydroxide.

(4) Regenerating cathode material: The solid A and the solution B were mixed and evaporated to remove water. A molar ratio of iron to lithium and phosphate in the evaporated solid (mol=6.131:6.063:6.196) was measured, and 0.065 mol of ferrous oxalate and 0.134 mol of lithium carbonate (molar ratio of iron to lithium and phosphate radical=6.196:6.197:6.196) were added. Then 75 g of glucose were added for mixing and ball-milling, heated to 570° C. in neon environment, sintered for 8 hours and 31 minutes, and cooled to obtain regenerated lithium iron phosphate cathode material.

Embodiment 5

A method for recycling and preparing a cathode material from a waste lithium iron phosphate battery includes the following steps.

(1) Pre-treating battery: 42.7 kg of recycled waste lithium iron phosphate batteries were put into tap water containing 1.7% sodium chloride (mass concentration), discharged for 4 days, and then exposed to solar radiation to dry electrolytes inside the batteries. The batteries were sheared for three times to get crushed pieces, and make an area ratio of the crushed pieces to the batteries was about 30%. The crushed pieces were placed in a stripping liquid (a volume ratio of propanetriol to triethyl phosphate was 1:0.6), covered by the stripping liquid, heated up to 180° C. by a heating plant, maintained at the temperature for 2 hours and 40 minutes, stirred and sieved to obtain solids and a separation liquid. The solids were aluminum and copper foils and recycled. The separation liquid containing plate-like active substances was heated continuously at 244° C. until the separation liquid did not change, and the stripping liquid was recycled to separate the plate-like active substances. The plate-like active substances were ground and demagnetized to obtain 9.4 kg of black powder.

(2) Removing carbon and fluorine: 35.0 g of sodium p-toluenesulfonate were added into the black powder obtained in step (1) and mixed. A heater and a pump of a fluidized bed were enabled to heat and pump air, and pump the black powder to a combustion chamber for reaction. A heating temperature of the combustion was controlled to be about 570° C. Then the black powder was burnt and cooled to recycle 7.4 kg of black powder with carbon and fluorine removed.

(3) Removing impurities: 1.0 kg of black powder with carbon and fluorine removed were taken and pickled with 1 mol/L phosphoric acid for solid-liquid separation to obtain a solid A and a solution A. The solid A was washed with water for later use. 2.7 g of calcium hydroxide were added to the solution A and stirred to adjust a pH until the precipitation did not increase, and then solid-liquid separation was performed to obtain a solid B and a solution B. The solution B was a solution containing lithium hydroxide.

(4) Regenerating cathode material: The solid A and the solution B were mixed and evaporated to remove water. A molar ratio of iron to lithium and phosphate in the evaporated solid (mol=6.158:6.104:6.214) was measured, and 0.048 mol of ferrous oxalate and 0.060 mol of lithium carbonate (molar ratio of iron to lithium and phosphate radical=6.163:6.161:6.214) were added. Then 80 g of glucose were added for mixing and ball-milling, heated to 570° C. in neon environment, sintered for 8 hours and 31 minutes, and cooled to obtain regenerated lithium iron phosphate cathode material.

Comparative Example 1

Comparative Example 1 was different from Embodiment 1 in that: In the treatment of removing carbon and fluorine in step (2), conventional heating pipes were used for removing carbon and fluorine. The black powder was sent to a tube furnace and heated at 510° C. for 8 hours to remove carbon and fluorine. The remaining steps were the same as that in Embodiment 1.

Comparative Example 2

Comparative Example 2 was different from Embodiment 1 in that: no sodium p-toluenesulfonate was added in step (2), and only the fluidized bed was used for removing carbon and fluorine. The remaining steps were the same as that in Embodiment 1.

Product Effect Test:

(1) Contents of the carbon and the fluorine in the black powder before and after removing carbon and fluorine in each embodiment and comparative example were tested. The test results were shown in Table 1.

TABLE 1

Contents of carbon and fluorine in black powder before and after removing carbon and fluorine in embodiments and comparative examples

| Embodiment | | Carbon content (%) | Fluorine content (%) |
|---|---|---|---|
| Embodiment 1 | Before removing carbon and fluorine | 20.32 | 0.016 |
| | After removing carbon and fluorine | 1.78 | 0.0038 |
| Embodiment 2 | Before removing carbon and fluorine | 20.36 | 0.019 |
| | After removing carbon and fluorine | 1.87 | 0.0041 |
| Embodiment 3 | Before removing carbon and fluorine | 20.33 | 0.016 |
| | After removing carbon and fluorine | 1.39 | 0.0028 |
| Embodiment 4 | Before removing carbon and fluorine | 20.26 | 0.018 |
| | After removing carbon and fluorine | 1.64 | 0.0017 |
| Embodiment 5 | Before removing carbon and fluorine | 20.19 | 0.015 |
| | After removing carbon and fluorine | 1.45 | 0.0023 |
| Comparative Example 1 | Before removing carbon and fluorine | 20.38 | 0.015 |
| | After removing carbon and fluorine | 3.45 | 0.0087 |
| Comparative Example 2 | Before removing carbon and fluorine | 20.29 | 0.016 |
| | After removing carbon and fluorine | 2.59 | 0.0050 |

From Table 1, it can be seen that the carbon and fluorine contents of the black powder after removing carbon and fluorine in the embodiments are obviously lower than those of the comparative examples, and the carbon and fluorine can be effectively removed by using the fluidized bed combined with the benzene sulfonate for removing carbon and fluorine.

(2) The lithium iron phosphate cathode materials prepared in Embodiments 1 to 5 and Comparative Examples 1 to 2 were taken respectively to assemble button batteries. The specific assembly process was as follows.

The lithium phosphate cathode material, acetylene black and polyvinylidene fluoride (PVDF) were weighed according to a mass ratio of 8:1:1, mixed, stirred and ground, and a certain amount N-methyl pyrrolidone (NMP) solution was added as a solvent, and a slurry was obtained after stirring the mixture. The slurry was evenly coated on a clean aluminum foil, then placed in a heating pipe at 70° C. for 6 hours, and stamped into electrode plates with a diameter of about 15 mm. The lithium ion button battery was assembled in a glove box filled with neon gas. The prepared electrode plate was used as a cathode and 1.0 mol/LiPF$_6$ (solvent being vinyl carbonate) was used as an electrolyte. The button battery was assembled according to the order of a shell, an elastic sheet, a gasket, an anode (lithium metal plate), 0.25 mL of electrolyte, a diaphragm (polypropylene film), a cathode (electrode plate) and a shell.

Then, charge and discharge performances of the assembled batteries were tested on a constant current charge and discharge test device. The test conditions were as follows: a voltage range was 2.0 V to 3.5 V, a test rate was 0.5 C (152 mAh·g$^{-1}$), and the results of 30 cycles at 0.5 C rate were shown in Table 2.

TABLE 2

| Group | The first time (mAh·g$^{-1}$) | The 30$^{th}$ times (mAh·g$^{-1}$) |
|---|---|---|
| Embodiment 1 | 156.4 | 155.6 |
| Embodiment 2 | 156.8 | 155.6 |
| Embodiment 3 | 156.7 | 156.1 |
| Embodiment 4 | 156.9 | 155.7 |
| Embodiment 5 | 156.5 | 155.7 |
| Comparative Example 1 | 156.2 | 154.3 |
| Comparative Example 2 | 155.8 | 154.6 |

Figure 3:
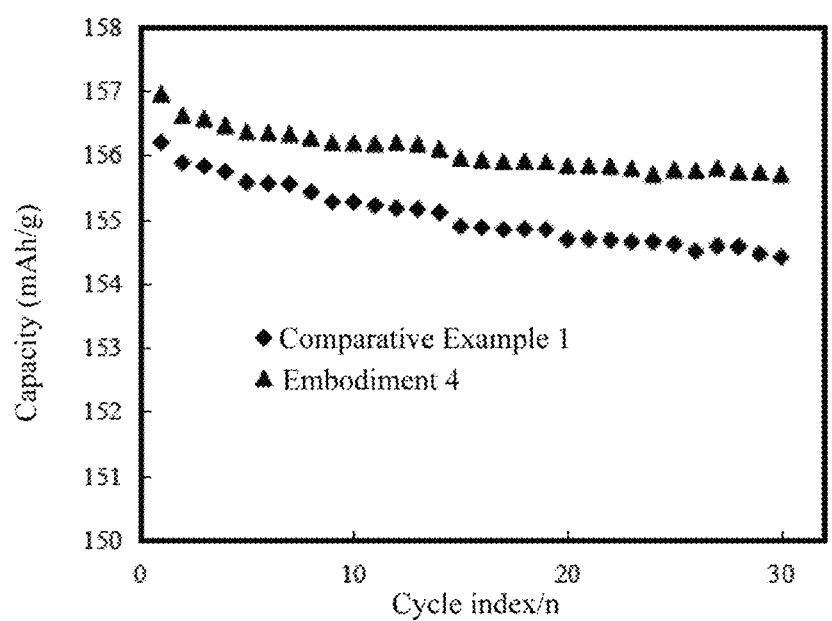
FIG. 3 is a discharge cycle performance diagram of button batteries assembled with the lithium iron phosphate cathode materials provided in Comparative Example 1 and Embodiment 4.

It can be known from Table 2 that the button batteries assembled with the lithium iron phosphate cathode materials provided by the embodiments have a specific capacity of 156 mAh·g$^{-1}$ or more after 30 cycles, and have excellent electrical performances which are obviously superior to these of the comparative examples. FIG. 3 is a discharge cycle performance diagram of the button batteries assembled with the lithium iron phosphate cathode materials provided in Comparative Example 1 and Embodiment 4. In FIG. 3, the X-coordinate refers to a cycle index, and the Y-coordinate refers to a discharge capacity. The 30-times discharge capacity of the button battery of Comparative Example 1 ranges from 154.3 mAh·g$^{-1}$ to 156.2 mAh·g$^{-1}$, and the 30-times discharge capacity of the button battery of Embodiment 4 ranges from 155.6 mAh·g$^{-1}$ to 156.4 mAh·g$^{-1}$. The lithium iron phosphate cathode material provided by Embodiment 4 has better cycle stability.

The invention claimed is:

1. A method for recycling and preparing a cathode material from waste lithium iron phosphate batteries, comprising:
  (1) discharging the waste lithium iron phosphate batteries, drying an electrolyte inside the waste lithium iron phosphate batteries, then crushing to obtain crushed pieces, and stripping the crushed pieces to obtain a black powder;
  (2) mixing the black powder obtained in step (1) with a benzene sulfonate, and then reacting in a fluidized bed to obtain a black powder with carbon and fluorine being removed;
  (3) adding an acid into the black powder with carbon and fluorine being removed in step (2), performing solid-liquid separation to obtain a solution A and a solid A; and then, adding an alkali into the solution A until no precipitation is generated, and performing solid-liquid separation to obtain a solution B and a solid B; and
  (4) mixing the solid A and the solution B obtained in step (3), adding at least one of a lithium supplement agent, an iron supplement agent or a phosphate to obtain a mixture, then adding a reducing agent into the mixture, and sintering to obtain the cathode material.

2. The method of claim 1, wherein in step (1), an area ratio of the crushed pieces to the waste lithium iron phosphate batteries is greater than 5%.

3. The method of claim 1, wherein in step (1), the stripping comprises placing the crushed pieces in a stripping liquid, performing primary heating, and separating into a solid and a separated liquid; and then subjecting the separated liquid to secondary heating, and removing the stripping liquid to obtain the black powder.

4. The method of claim 3, wherein the stripping liquid comprises polyol and phosphoester.

5. The method of claim 4, wherein the polyol is selected from at least one of ethylene glycol, propylene glycol, propanetriol, 1,2-butanediol or 1,3-butanediol; and the phosphoester is selected from at least one of phosphomonoester, phosphodiester, phosphotriester, triethyl phosphate or trimethyl phosphate.

6. The method of claim 5, wherein a volume ratio of the polyol to the phosphoester is 1:(0.1 to 1).

7. The method of claim 4, wherein a volume ratio of the polyol to the phosphoester is 1:(0.1 to 1).

8. The method of claim 3, wherein the primary heating is performed at a temperature of 130° C. to 210° C., and the primary heating lasts for 0.5 hour to 10 hours; and the secondary heating is performed at a temperature of 210° C. to 300° ° C., and the secondary heating lasts for 2 hours to 12 hours.

9. The method of claim 1, wherein in step (2), an addition amount of the benzene sulfonate is 0.1 w % to 5 w % of the black powder.

10. The method of claim 9, wherein in step (2), the benzene sulfonate is selected from at least one of sodium p-toluenesulfonate, sodium benzenesulfonate or zinc benzenesulfonate.

11. The method of claim 1, wherein in step (2), the reacting is performed at a temperature of 300° ° C. to 850° C., and lasts for 1 minute to 360 minutes.

* * * * *